United States Patent [19]

Patin

[11] Patent Number: 5,040,812
[45] Date of Patent: Aug. 20, 1991

[54] INCLINABLE VEHICLE

[76] Inventor: Pierre Patin, 11 Rue Buffon, 75005 Paris, France

[21] Appl. No.: 462,082

[22] Filed: Jan. 8, 1990

Related U.S. Application Data

[63] Continuation of Ser. No. 65,282, Jun. 22, 1987, Pat. No. 4,921,263.

[30] Foreign Application Priority Data

Jun. 27, 1986 [FR] France ............................. 86 09332

[51] Int. Cl.$^5$ .............................................. B62D 61/06
[52] U.S. Cl. ..................................... 280/62; 280/772; 280/112.2
[58] Field of Search .............. 280/220, 221, 112.2, 280/62, 772, 6.11; 180/215

[56] References Cited

U.S. PATENT DOCUMENTS

| | | | |
|---|---|---|---|
| 1,688,579 | 10/1928 | Franks | 474/130 |
| 2,152,938 | 4/1939 | Welch | 280/112.2 |
| 2,788,986 | 4/1957 | Kolbe | 280/112.2 |
| 2,954,833 | 10/1960 | Davidson | 280/6.11 X |
| 2,960,941 | 11/1960 | Li | 280/112.2 |
| 2,961,254 | 11/1960 | Muller | 280/112.2 |
| 3,781,031 | 12/1973 | Patin | 280/62 |
| 4,003,443 | 1/1977 | Boughers | 280/112.2 X |
| 4,740,004 | 4/1988 | McMullen | 280/112.2 X |
| 4,974,863 | 12/1990 | Patin | 280/62 |

FOREIGN PATENT DOCUMENTS

| | | | |
|---|---|---|---|
| 685880 | 12/1939 | Fed. Rep. of Germany | 280/772 |
| 913390 | 7/1949 | Fed. Rep. of Germany | 280/112.2 |
| 911460 | 5/1954 | Fed. Rep. of Germany | . |
| 229608 | 10/1986 | Japan | 280/112.2 |

Primary Examiner—Andres Kashnikow
Assistant Examiner—Michael Mar
Attorney, Agent, or Firm—Bachman & LaPointe

[57] ABSTRACT

This invention relates to an inclinable vehicle having three or more wheels. The invention provides a stabilizer system for the vehicle so that the stationary vehicle does not fall. The vehicle comprises a primary part including two wheels (1a, 1b) and a distortable suspension structure (2) connecting the wheels, and a structural member (4) mounted on a chassis member to tilt with the suspension structure. The tilting rotates an arm (5) with a multiplication ratio, and a roller on the arm (5) runs on a cross-member (19). The secondary part (6) of the vehicle slides on the structural member (4) and is carried by the cross-member (19) so that rotation of the arm (5) on tilting of the vehicle lifts the secondary part and raises the overall center of gravity of the vehicle. In a variant, the rise of the center of gravity is obtained by rotation of the secondary part of the vehicle. A clutch may be provided to disengage the stabilizer while the vehicle is moving.

5 Claims, 7 Drawing Sheets

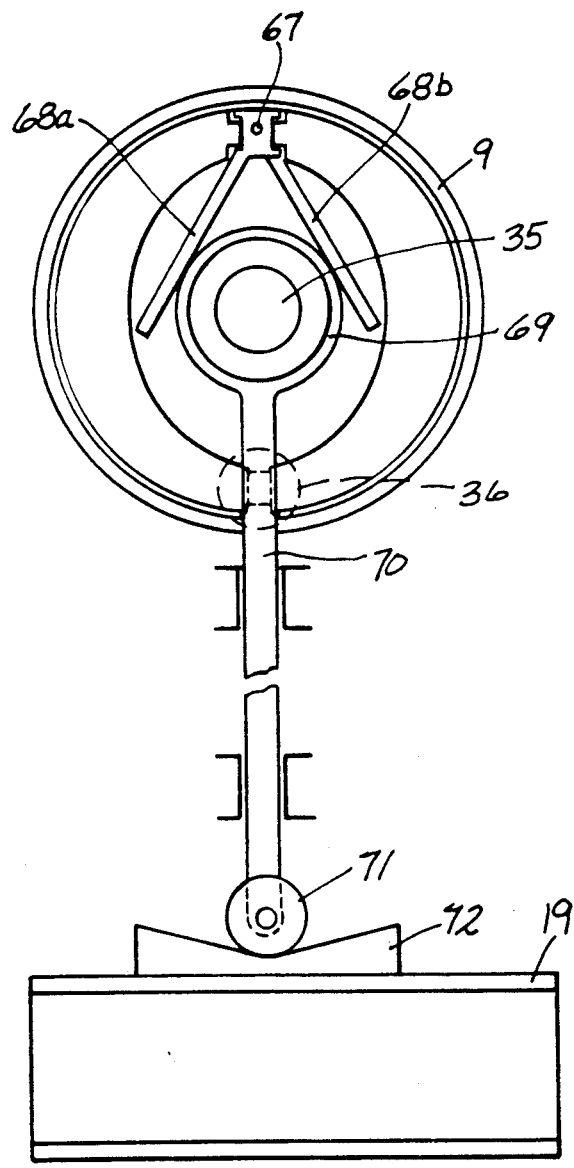
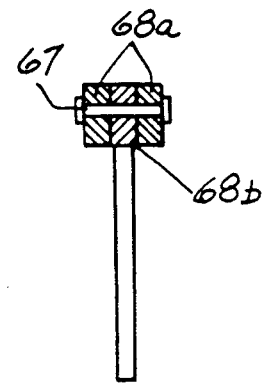
FIG-14A
FIG-14B

INCLINABLE VEHICLE

This is a continuation of application Ser. No. 065,282 filed June 22, 1987 now U.S. Pat. No. 4,921,263.

BACKGROUND OF THE INVENTION

This invention relates to an inclinable vehicle, that is to say a vehicle which may incline or heel relating to the ground. More particularly, the invention relates to an inclinable vehicle with three or more wheels; such a vehicle may be narrow and comparable in width to a two-wheel vehicle.

DESCRIPTION OF THE PRIOR ART

Inclinable multi-wheel vehicles are known with articulated suspensions, either by articulating the structure of the vehicle on an axle as described in French Patents 1 562 248 and 1 031 813 (P. PATIN) or by a distortable parallelogram or trapezoid system as described in U.S. Pat. No. 3,480,098 (J. E. Ward Jr.) or even by independent wheel and strut suspensions as known in automobile technology and described in French Patents 828405 (F. MATTON) and 1 207 733 (K. J. LINDBOM), for example.

Such vehicles have dynamic stability like a two-wheel vehicle but are not inherently stable when stationary; in fact, when the vehicle is stationary, a small lateral angular displacement away from the vertical increase the torque produced by the spaced actions of the weight and the reaction of the ground, tending to increase the inclination of the vehicle; thus the center of gravity of the vehicle descends and the potential energy of the distortable system reduces as the vehicle inclines more.

OBJECTS OF THE INVENTION

An object of the invention is to provide an inclinable vehicle which is inherently stable when stationary.

Another object of the invention is to provide stabising means for an inclinable multi-wheel vehicle.

A more specific object of the invention is to provide an inclinable multi-wheel vehicle whose center of gravity rises, increasing the potential energy of the system and giving inherent stationary stability, without utilization of external energy.

Yet another object of the invention is to provide stabilizing means for an inclinable vehicle which may be selectively operative when the vehicle is stationary, or travelling at low speed, the vehicle being dynamically stable at higher speed.

Still another object of the invention is to provide an articulated system for such a vehicle, in which the relations between the links of the systems are modified as a function of the apparent vertical so as to maintain the system reference substantially parallel to the apparent vertical.

DESCRIPTION OF THE PRESENT INVENTION

The present invention provides an inclinable multi-wheel vehicle comprising a primary part, a secondary part borne rotatably by said primary part, said primary part including at least first and second wheels and a distortable structure connecting said first and second wheels and enabling lateral inclination of the structure and the wheels, on inclination of the vehicle, and connection means connecting said secondary part with said structure for movement relative to said structure in response to inclination of the structure with a drive ratio such that inclination of the vehicle away from the apparent vertical lifts the center of gravity of said secondary part and raises the center of gravity of the vehicle, whereby to confer stationary stability on the vehicle, inclination of the primary part, that is to say rotation of the longitudinal median plane of the primary chassis relative to an axle or transverse rocker, that is to say relative to the ground, lifts the secondary part and causes the center of gravity of the vehicle to rise. If desired, this stabilising action may be effective only when needed, especially when the vehicle is stationary, due to a clutch or dog-clutch system which may be controlled by the driver and/or by the speed and/or by the inclination relative to the real or apparent vertical (resultant of the gravity and centrifugal force).

DESCRIPTION OF THE DRAWINGS

Other features and advantages of the invention will appear from the following description of the embodiments thereof, given by way of example with reference to the accompanying drawings, in which:

FIGS. 14a and 14b of another type of clutch control;

DETAILED DESCRIPTION

Figure 1:
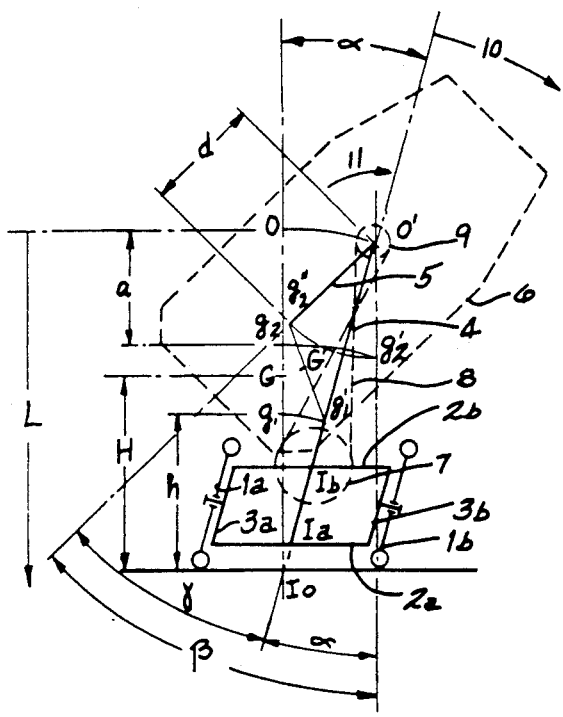
FIG. 1 is a schematic diagram of a vehicle whose body or cab forms a secondary part which is raised in relation to the whole about a point of the primary chassis.

FIG. 1 shows schematically the rear part of an inclinable 3-wheel vehicle. The rear wheels 1a, 1b are secured to a hinged parallelogram comprising two members 2a, 2b parallel to the ground and two members 3a, 3b parallel to the planes of the wheels. A load-bearing member 4 is hinged on the mid-points IA and IB of the members 2a and 2b. A suspended structure represented by the broken line 6 is solid with a rotatable arm 5 hinged at 0 on the load-bearing member 4. On the member 2b is fixed a pulley 7 which is connected by a belt 8 to drive a second pulley 9 solid with the arms 5. As shown in FIG. 1, the belt is crossed, which means that if the vehicle in inclined by an angle $\alpha$ in the direction of the arrow 10, the pulley 9 rotates in the same direction, indicated by the arrow 11. If R is the radius of the pulley 7 and r that of the pulley 9, the pulley 9 rotates through an angle $\gamma = R/r\alpha = k\alpha$ relative to the axis 0, that is to say through an angle $\beta = \gamma + \alpha = (R/r+1)\alpha$ relative to the vertical, assuming the ground to be horizontal. It will be seen that, if the belt were not crossed, the multiplication ratio would be $$(R/r - 1) = k - 1$$

In the following description, the expression "primary part" of the vehicle will be used to refer to the assembly comprising the hinged parallelogram, of the structural member 4 and everything which is solid with this member and accompany its movement; the expression "secondary part" will be used to refer to everything which is solid with the rotatable arm 5 hinged at 0 on the member 4.

At the origin of the movement, the center of gravity of the primary part is at g1, that of the secondary part is at g2 and the overall center of gravity G is between g1 and g2. After a small rotation through the angle $\alpha$, g1 moves to g'1 and g2 to g"2 after two components of rotation: g2 g'2 and g'2 g"2 ; G moves to G', between g'1 and g"2.

If H is the height above the ground of G, h that of g1, L that of 0, and d is the distance of g2 from the point 0 and p1 and p2 the respective weights of the primary assembly and the secondary assembly, the torque tipping the assembly relative to one point Io on the ground is $$C1 = p1\ h\ \sin\alpha + p2\ (L\sin\alpha - d\sin\beta).$$

There exist a righting torque p2 d sin $\beta$ which is multiplied by the pulleys in the ratio k of their radiuses and the torsue opposing the rotation of the member if relative to the pulley 7 solid with the member 2b, which stays substantially parallel to the ground, is therefore:

$$C2 = Kp2\ d\ \sin\beta$$

If $\alpha$ and $\beta$ are small, which is the case when the vehicle begins to incline, $$\beta = (R/r+1)\alpha = (k+1)\alpha,\ \sin\beta \simeq \beta = (k+1)\alpha$$

$$C2 = p2\ dk(k+1)\alpha \text{ and } C1 = p1\ h\ \alpha + p2\ [L\alpha - d(k+1)]$$

therefore $$\frac{C2}{C1} = \frac{p2\ d\ k(k+1)}{p1\ h + p2[L - d(k+1)]}$$

H being the rest height of the center of gravity, it follows that $$H = \frac{p1\ h + p2(L - d)}{p1 + p2}$$

and since $p1 + p2 = P$; $PH = p1\ h + p2(L-d)$ the vehicle will not tip over if $$\frac{C2}{C1} > 1 \text{ or } C2 > C1$$

$$p2\ d\ K(K+1) > p1\ h - p2\ k\ d + p2(L - d)$$

$$p2\ d[K(K+2) > PH$$

or lastly $K(K+2) > \frac{PH}{P_2\ d}$

It will be appreciated that this condition corresponds to the fact that G rises when moving to G'

Thus $\dfrac{H = p_2(L - d) + p_1 h}{P}$ becomes $\dfrac{H' = p_2(L\cos\alpha - d\cos\beta) + p_1 h\cos\alpha}{P}$ where $\cos\alpha \simeq 1 - \dfrac{\alpha^2}{2}$, $$\cos\beta = 1 - \frac{\beta^2}{2} \simeq 1 - \frac{\alpha^2}{2}(k+1)^2$$

and $H' - H = \dfrac{1}{P}\left[p2\left(-L\dfrac{\alpha^2}{2} + d\dfrac{\beta^2}{2}\right) - p1h\dfrac{\alpha^2}{2}\right]$ $= \dfrac{\alpha^2}{2P} p2\{-L + d(k+1)^2\} - p1\ h$ since $L = \dfrac{d + PH - p1\ h}{p2}$ $$H' - H = \frac{\beta^2}{2P}[p2\ d\{(1+k)^2 - 1\} - PH]$$

and H'- H is positive, that is to say G will rise if $$(k+1)^2 - 1 > \frac{PH}{p_2 d} \text{ Now } (K+1)^2 - 1 = k(k+2)$$

The same condition is therefore found.

Figure 2:
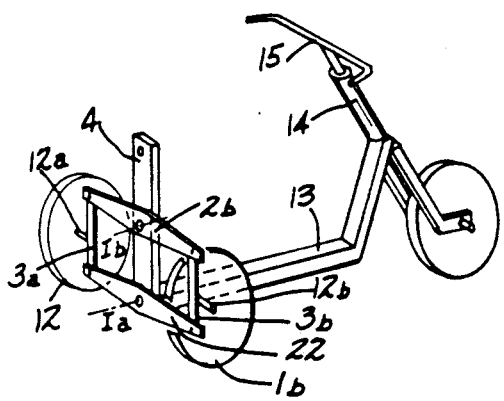
FIG. 2 is a perspective view of a primary chassis of the vehicle illustrated in FIG. 1.

FIG. 2 shows a manner of making the primary part of an inclinable vehicle in accordance with this embodiment of the invention. The real wheels 1a, 1b are fixed by their axles 12a, 12b to the members 3a, 3b which form with the rocking beams 2a, 2b the distortable parallelogram of FIG. 1. The structural member 4 is hinged at Ia and Ib to the parallelogram and is itself solid with a longitudinal beam 13 forming the skeleton of the vehicle's chassis. The front of the beam 13 bears the steering column 14 which receives the handle-bar 15. Suspension members (not shown) may be incorporated between the axle 12a, 12b of the wheels and the member 3a, 3b.

Figure 3:
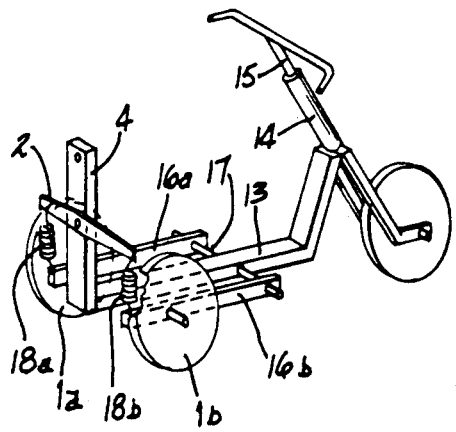
FIG. 3 is a perspective view of an alternative primary chassis of the vehicle shown in FIG. 1, in which the wheels are connected to the chassis by trailing suspension arms coupled by a rocking-beam instead of the hinged parallelogram of FIG. 2.

FIG. 3 shows another manner of making the primary part.

The members 4, 13, 14 and 15 of the chassis are the same as in FIG. 2.

The rear wheels 1a, 1b are mounted on trailing arms 16a, 16b hinged on a shaft 17 fixed to the beam 13 and perpendicular to the longitudinal median plane of the vehicle. The weight of the vehicle is applied to the rocking-beam 2 and transmitted to the trailing arms 16a, 16b by sprung shock absorbers 18a, 18b.

This system is substantially equivalent to the previous system and has the advantage of enabling ready transmission of the movement to the wheels by means of rotating members borne by the shaft 17, and not shown in the drawing.

Figure 4:
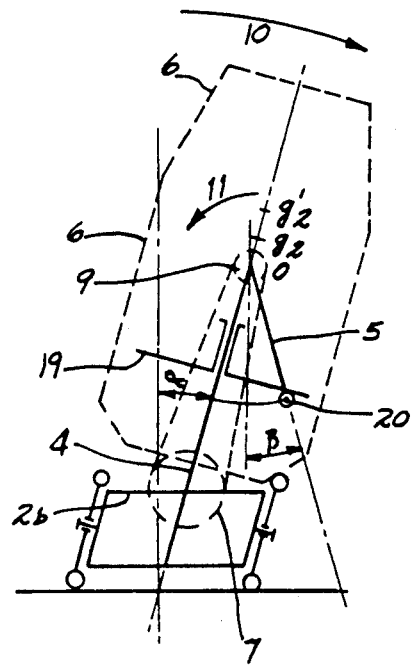
FIG. 4 is a schematic diagram of a vehicle whose body forms the secondary part which is raised by rotation of a rotatable arm but stays parallel to itself by sliding on a support connected to the primary chassis and is vertical when the chassis is at rest on a horizontal place.

FIG. 4 shows a vehicle in accordance with another embodiment of the invention in which the primary part slides along the structural member 4, instead of rotating as it inclines as in FIG. 1. Similarly, the drive belt between the pulleys 7 and 9 is not crossed, so that the pulley 9 rotates through an angle $\beta$ opposite to the angle $\alpha$ and whose absolute value is $$\beta = (k-1)\alpha$$

where $K = R/r$

The secondary part is solid with a cross-member 19 and slides freely on the member 4. The cross-member is borne by a roller 20 fixed to the end of the rotating arm 5 of length d, solid with the pulley 9. If h2 is the rest weight of the center of gravity g2 of the secondary part, g2 moves to g'2 by the action of the rotations and h2 becomes $$h'2 = [h2 + d\{1 - \cos(\alpha + \beta)\}]\cos \alpha = \left(1 - \frac{\alpha^2}{2}\right)$$

$$\left[h2 + d\frac{K^2 \alpha^2}{2}\right]$$

The force applied to the roller is now only $p2 \cos \beta$ but the corresponding torque is $p2\, d \cos \beta \sin(\alpha+\beta)$. The condition for non-tipping is:

$$kp2\, d\left(1 - \frac{\alpha^2}{2}\right)k > \left[p1\, h + p2\, h2 + p2\, d\frac{k^2 \alpha^2}{2}\right]\alpha$$

or:

$$k^2 p2\, d\left(1 - \frac{\alpha^2}{2}\right) > PH + p2\, d\frac{k2\, \alpha^2}{2}$$

After all reductions, we have $$K^2 (1 - \alpha^2) > \frac{PH}{p2d}$$

and if $\alpha$ is small it can be written as $$k^2 > (1 + \epsilon)\frac{PH}{p2d}.$$

where $\epsilon$ is of the order of $\alpha^2$.

The same condition is obtained by writing that the overall center of gravity G has risen during the inclination movement of the vehicle.

If the belt connecting the pulleys were crossed, the same condition would be obtained. The rotational connection between the member 4 belonging to the primary part and the rotatable arm 5 belonging to the secondary part (FIG. 1) or producing the movement of the secondary part (FIG. 4) has been shown in these two drawings as formed by sets of pulleys and belts. It will be appreciated that this connection may also be formed by gears. In any case, this connection defines a progressive return torque which, when the vehicle is halted on a horizontal plane, returns it to the vertical and therefore gives it natural stability.

If the vehicle is moving on a horizontal plane and in a curve, the return torque will tend to oppose the inclination that the driver will wish to give the vehicle. Thus it will be possible to seek to produce connections which do not give constant demultiplication ratios to the relative rotations of the members 4 and 5. The connections may be obtained in simple manner as shown in FIGS. 5 to 9.

In FIGS. 5a to 7b, the lateral member 3a and 3b are extended upwards. At the same level, the structural member 4 bears a rocker-beam 23 which is fixed perpendicular to the rotatable arm 5 connected to the secondary structure.

In FIGS. 5a to 6c, the arms bear rollers 24a, 24b at their ends, the movement of the rollers causing rotation of the rocker-beam 23 whose ends bear sliders in which run the rollers 24a, 24b. In FIGS. 5b and 6b, it is the rocker-beam which bears the rollers 25a, 25b which run in the sliders borne by the arms 22a, 22b.

These various systems have in common the disadvantage of giving a return torque which increases with inclination, which may be a problem in case of a curve taken at high speed inducing a high centrifugal force although this acts favorably in an apparatus of the kind shown in FIG. 1.

Figure 5A:
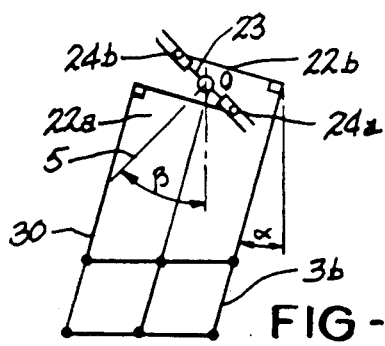
FIGS. 5a, 5b and 5c are partial schematic diagrams illustrating different rotation-multiplier systems for rotation in the same direction relative to the vertical.
Figure 6A:
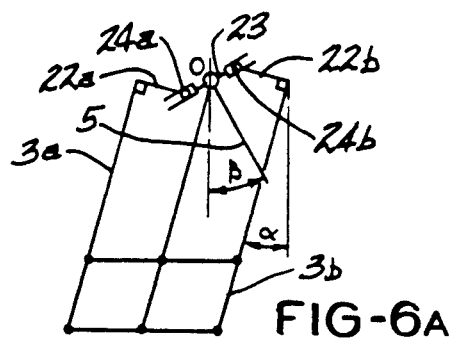
FIGS. 6a, 6b and 6c are partial schematic diagrams illustrating different rotation multiplier systems for rotation in opposite directions.
Figure 5B:
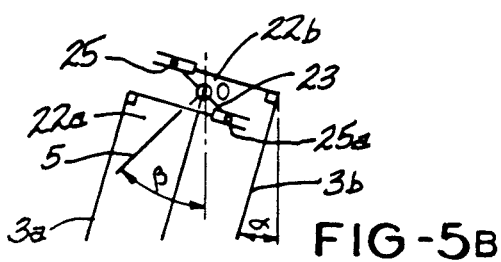
Figure 6B:
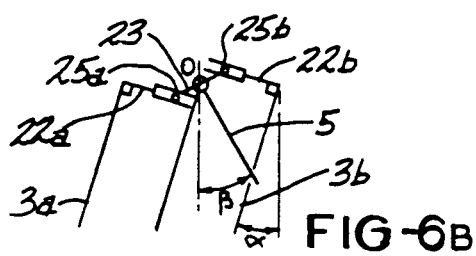
Figure 5C:
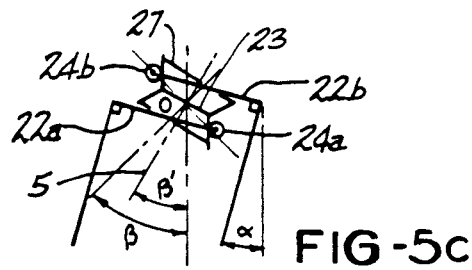
Figure 6C:
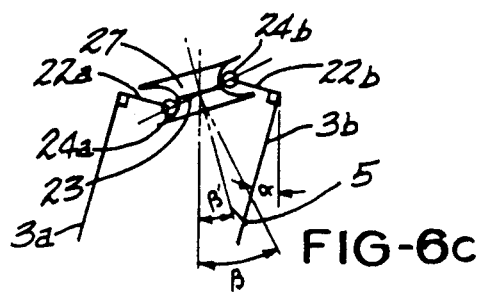

FIGS. 5c and 6c show apparatus derived from those of FIGS. 5a and 6a but the action of the rollers 24a, 24b is not applied to the rocker-beam 23 itself but to a cam 27 whose shape is carefully chosen to obtain a desired law $\beta' = f(\alpha)$. It will be seen from these figures that the angle $\beta'$ is smaller than the angle $\beta$ which would result from the apparatus of FIGS. 5a, 5b and 6a, 6b. With such apparatus, it is even possible, for example as in FIG. 5c, to bring the value of $\beta$ to equal that of $\alpha$ for big inclinations, that is to say to cancel the return torque.

In the case of FIG. 4, a less progressive return torque would also be obtained by giving the cross-member 19 a shape which is slightly concave upwardly.

Figure 7A:
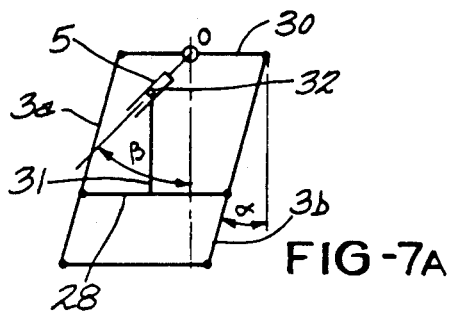
FIGS. 7a and 7b are partial schematic diagrams illustrating further multipliers for rotation in the same direction.

FIG. 7a shows another mode of connection. The hinged parallelogram is provided with a fifth member 28 to which is fixed perpendicularly a rod 31 bearing a roller 32 which runs in a slider on the member 5 hinged at 0.

Figure 7B:
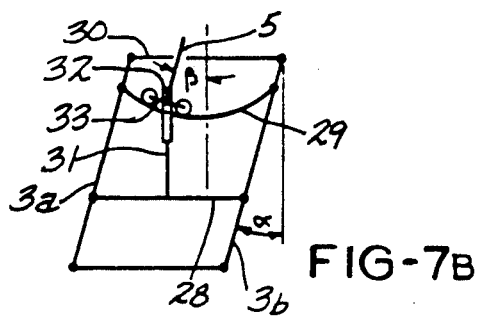

FIG. 7b shows a system close to that of FIG. 7a but in which the hinge at 0 becomes virtual and is replaced by a ball race along which runs a carriage 33 which bears the secondary structure and is guide by the rod 31 in which runs a roller 32 borne by the carriage 33. The ball race 29 may have any suitable desired shape to obtain a given return torque.

Figure 8:
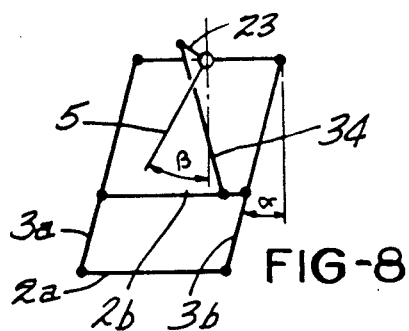
FIG. 8 is a partial schematic diagram illustrating yet another multiplier for rotation in the same direction.
Figure 9:
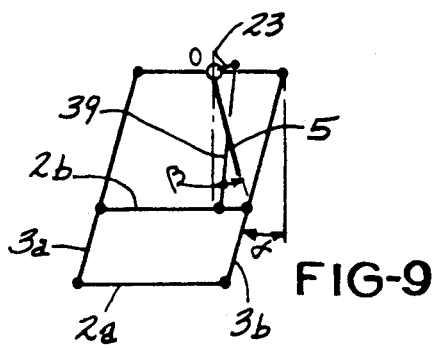
FIG. 9 is a partial schematic diagram illustrating yet another multiplier for rotation in opposite directions.

FIGS. 8 and 9 show simplified rotational connection apparatuses, comprising a simple push-rod 34 connecting the member 2b with the rocker-beam 23, the hinge points being chosen so that the lever arm of 2b is longer than the lever arm of 23.

All the apparatuses described above, by way of non-limitative examples, comprise a permanent connection between the member 2b connected to the primary structure and the rotatable arm 5 which produces the raising of the secondary structure. It will be readily appreciated that this may be a disadvantage if the vehicle is to move and/or park on non-horizontal ground, independently of the presence, as mentioned above, of a return force which may add to at least a part of the centrifugal force.

A feature of a preferred embodiment of the invention consists in producing this connection only when necessary, that is to say when the vehicle is halted, while when the vehicle is being driven it is free in inclination and behaves like a two-wheel vehicle.

Figure 10A:
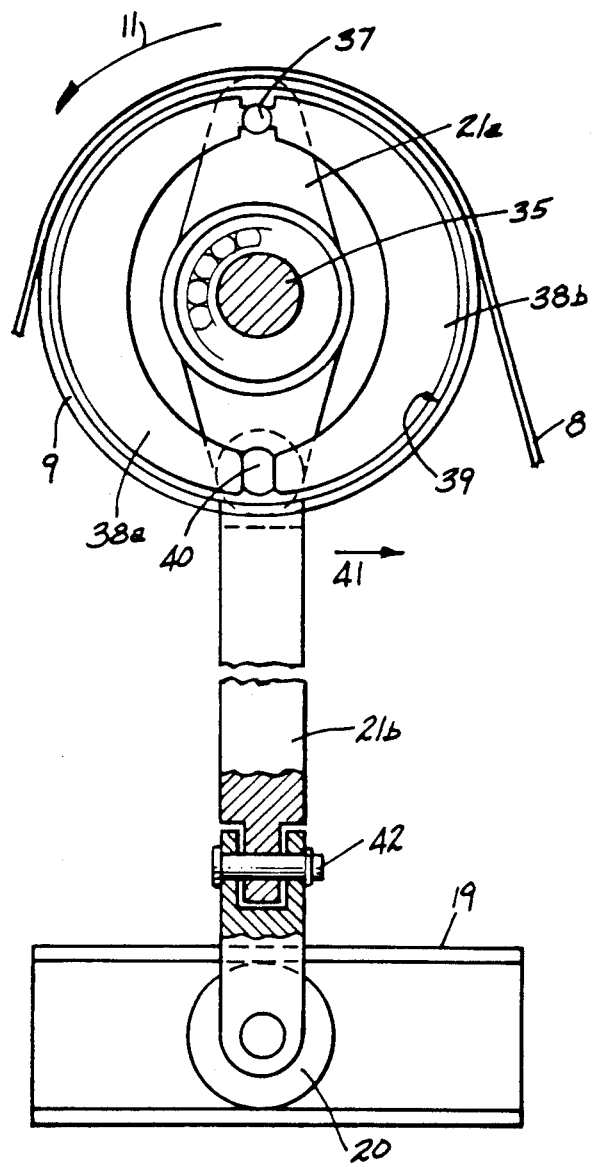
FIGS. 10a and 10b are partial front and side views respectively of a declutchable stabilizer.
Figure 10B:
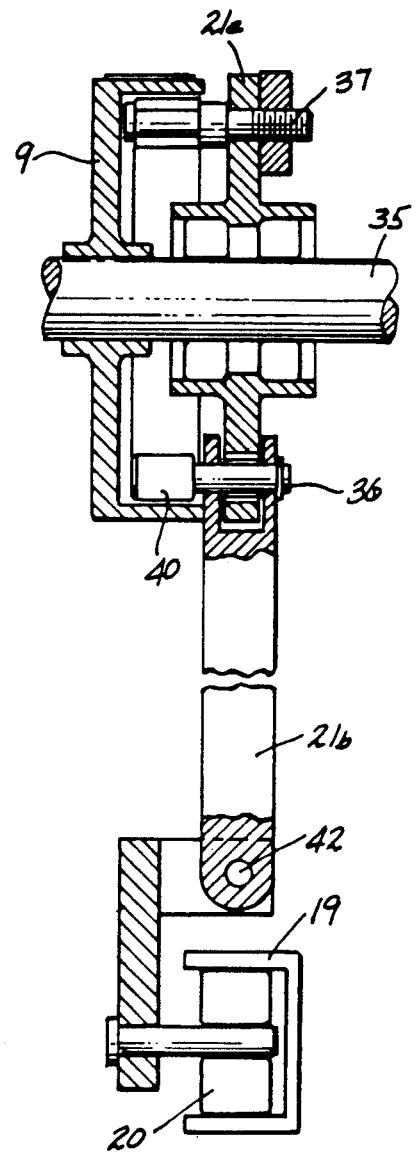

To this end, an application of this feature will now be described as applied to a system of the kind shown in FIG. 4. FIGS. 10a and 10b show a clutch system between the arm 5 and the pulley 9.

On the shaft 35 of the pulley 9, borne by the primary structure member 4, an arm 21a is mounted rotatably on which the shaft 36 of a secondary arm 21b is hinged, the shaft 36 and arm 21b being solid in rotation and the assembly 21a, 21b replacing the rotatable arm 5. The arm 21a bears by a shaft 37 two brake shoes 38a, 38b which engage frictionally in a cylindrical surface 39 formed with the pulley 9 coaxially therewith. The shaft 36 comprises a partially flat cam 40 whose rotation separates the shoes 38a, 38b and locks the assembly 21a, 21b with the pulley 9. If the pulley 9 rotates in the direction of the arrow 11 and if the hinge 36 is pushed in the same direction (arrow 41), the clutch engages and is maintained engaged by the sole effect of the torque applied by the weight of the secondary structure through the lever 21b and the cam 40. Indeed, the secondary structure is solid with the cross-member 19 borne by the roller 20 which itself is hinged at 42 to the arm 21b.

On the other hand, if the hinge 36 is pushed in the opposite direction to the rotation of the pulley 9, the weight of the secondary structure tends to unlock the brake shoes and the clutch does not engage.

The control of the clutch can be obtained either automatically by the action of gravity alone, or under the control of a device actuated by the driver and/or the speed of the vehicle.

The displacement of the hinge 36 which engages the clutch can be obtained by means of a device acting either on the lever 21b or on the rotating arm 21a or directly on the pair of brakes 38a, 38b.

Figure 11:
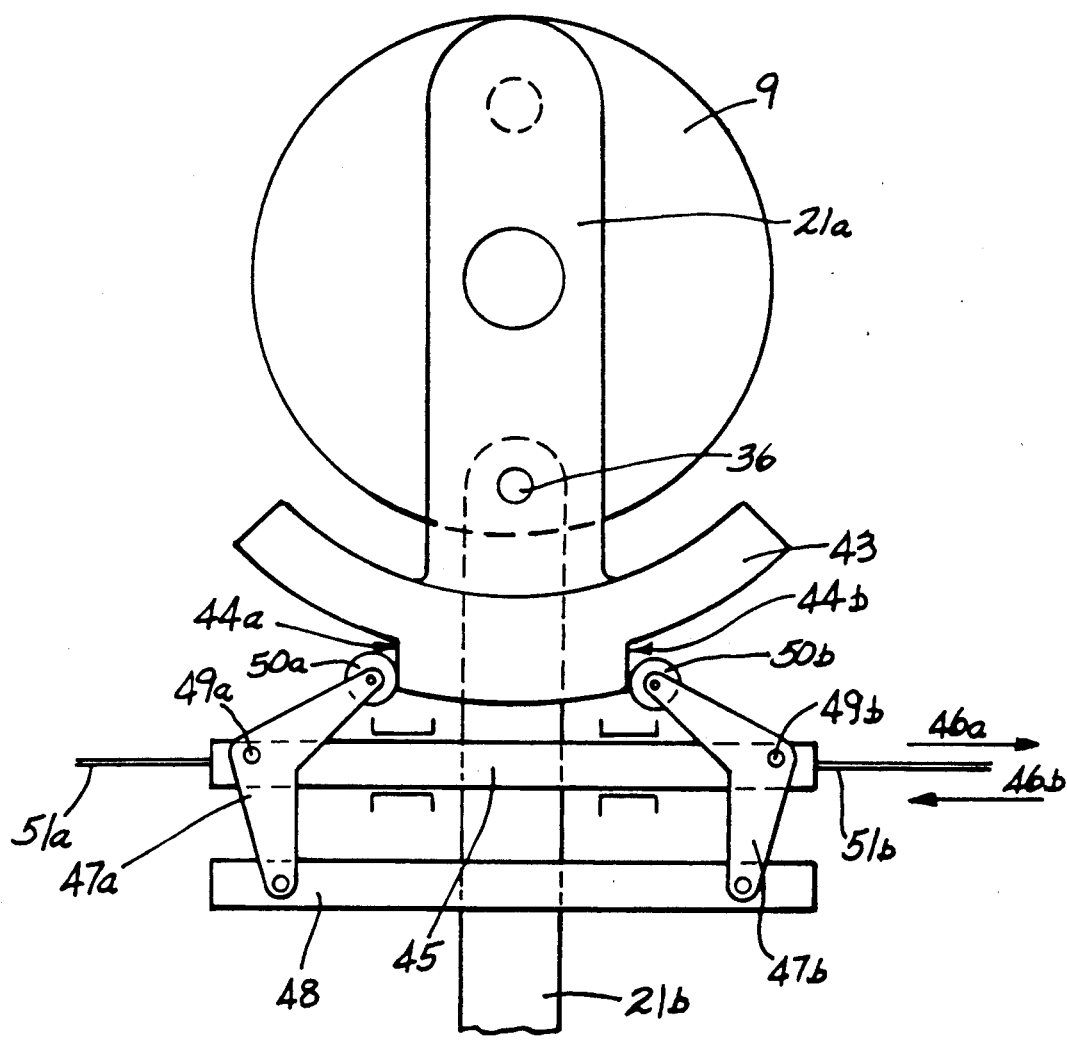
FIG. 11 is a partial front view of a clutch for this type of stabiliser.

FIG. 11 shows an apparatus controlled by gravity and/or by the inclination of the driver on his seat as described below. A sector 43 is fixed on the rotatable arm 21a and bears two symmetrical shoulders 44a and 44b. A plate 45, which slides freely on the primary structure member 4 parallel to the arrows 46a, 46b, bears cranked levers 47a and 47b at each end, which are connected together by a link 48 and are hinged on shafts 49a, 49b.

The end of a lever such as 47a which is not connected to the link bears a small roller 50a which bears, in the rest position, on the shoulder 44a. Displacement of the plate 45, in the direction of the arrow 46a for example, causes displacement upwards of the roller 50a and its cocking against the shoulder 44a while, on the contrary, the roller 50b is displaced downwards and disengages from the shoulder 44b. The displacement of the plate 45 then causes rotation of the sector 43 which can then rotate freely, locking the arm 21a with the brake-shoe system, without hindrance from the roller 50b and without taking the control device with it in the rest of its rotation.

Lateral displacement of the plate 45 is controlled by two cables or linkage 51a, 51b which are themselves connected to the lateral displacement of the secondary structure (or of a balance-weight) and/or to the inclination of the driver's seat.

Figure 12:
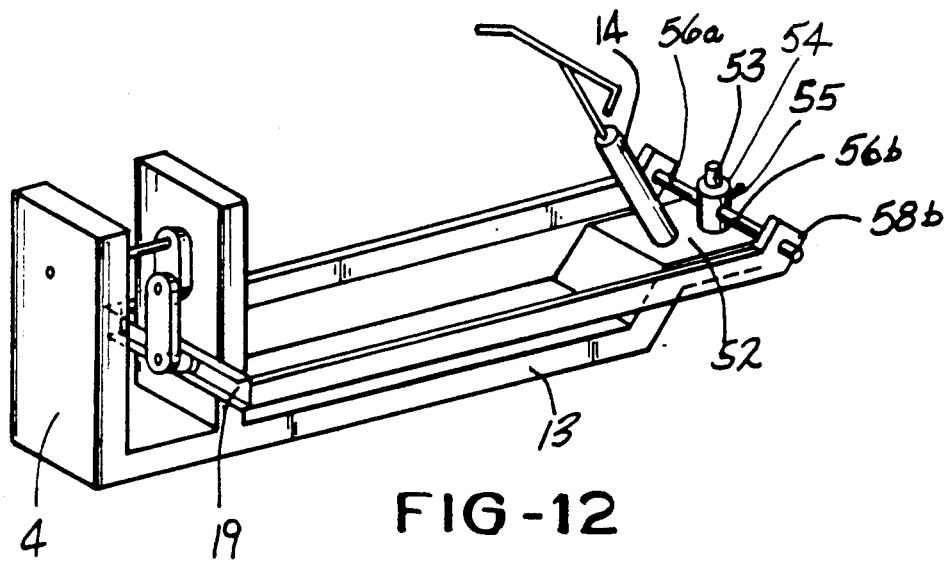
FIG. 12 a perspective diagram of the structure of a vehicle in which the body is hinged so as to form the secondary part whose movement participates in the stabilizing and clutch engagement.

FIG. 12 shows the mounting of the secondary structure on the primary structure to enable the secondary structure to move with two degrees of freedom. To this end, at the position of the steering column 14, the primary structure bears an extension 52 to which is fixed a shaft 53 parallel to the load-bearing member 4. On this shaft 53 is monted a gimbal 54 comprising a collar 55 from which project two shafts 56a, 56b parallel to the cross-member 19. The stringers 57a, 57b of the secondary structure are hinged on the axes 56a, 56b at 58a, 58b. It will be seen that the cross-member 19 can move about two axes of rotation, one parallel to the member, 4 and the other perpendicular to the median plane of the vehicle.

Figure 13:
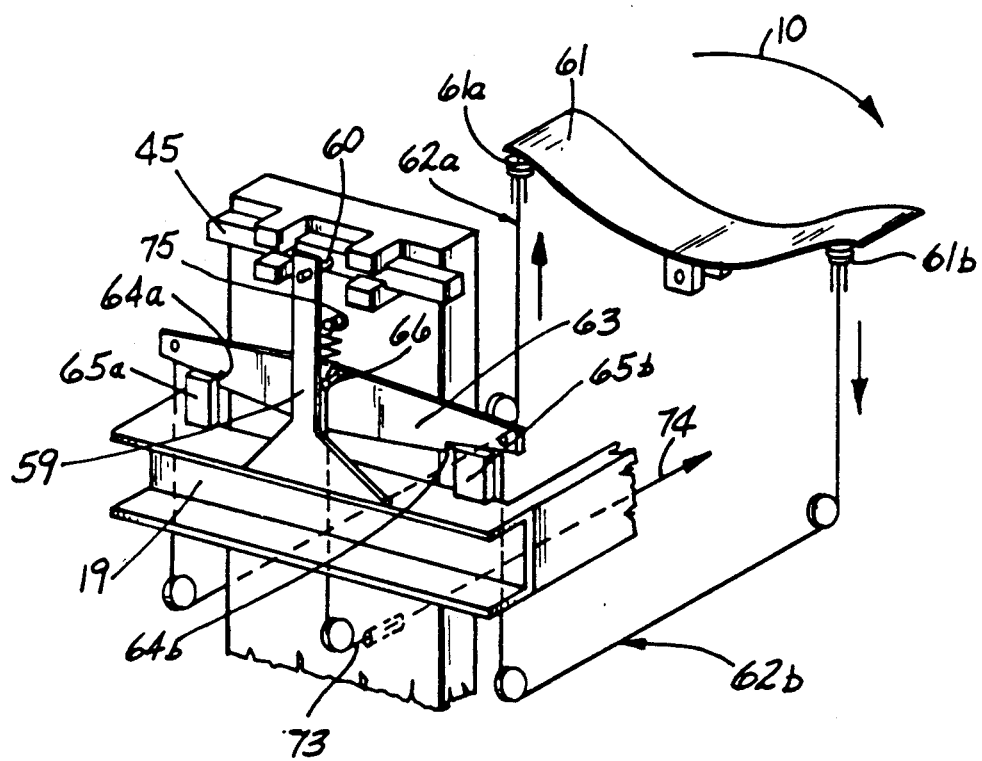
FIG. 13 is a partial perspective view showing the connection between the driver's seat and the clutch control shown in FIG. 12.
Figure 15:
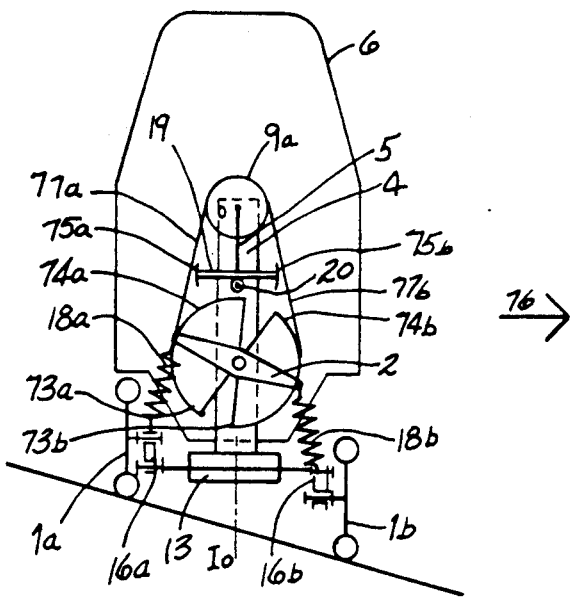
FIG. 15 is a partial schematic diagram of a connection system in which the clutch is replaced by a system based on the capstar phenomenon.

FIG. 13 shows how the clutch may be controlled by gravity but actuated by the driver.

The cross-member 19 is solid with a bracket 59 bearing a pin 60 which causes the movement of the plate 45 itself which, as described above, can engage the clutch when it moves in the same direction as the pulley 9 rotates. The movement of the cross-member 19 is controlled by the driver's seat 61 mounted on springs 61a, 61b and whose possible inclination is transmitted with reversal of the direction, to a rocker-beam 63 by cables 62a, 62b. This rocker-beam bears shoulders 64a, 64b which can interfere wi 65a, 65b solid with the cross-member 19. Thus, if the vehicle tends to incline to the right (direction of the arrow 10) two cases can occur:

1. The driver is turning right and leans the same way in this case, the rocker-beam 63 lifts to the left, the shoulder 64a locks the peg 65a, the cross-member 19 cannot move to the right under gravity and the movement stays free.
2. The driver halts the vehicle and, at the moment when the vehicle begins to fall to the right, leans to the left to regain balance; the rocker-beam 63 tilts to the right, as does the cross-member 19, engaging the clutch and actuating the stabilizer device.

It will be appreciated that the clutch control could be actuated directly by the seat, the gravity actuation having the advantage of operating even in the absence of the driver, or in the case of a mistaken operation.

The apparatus can also be controlled as a function of the vehicle speed. Thus a centrifugal regulator of suitable kind may be provided so that after a certain speed it acts on a cable 73 in the direction of the arrow 74 to lower the hinged shaft 66 of the rock-beam 63 against a return spring 75, so as to lock any movement of the cross-member 19 and to keep inclination of the vehicle entirely free as it is driven. Lastly, the engagement of the clutch can also be obtained directly by acting on the pivot 37 of the brake shoes 38a, 38b as shown in FIGS. 14a, 14b. In these Figures, the usual pivot of the pair of shoes on the shaft 37 is replaced by a scissors comprising two members 68a, 68b hinged on a shaft 67 whose branches bear on a ring 69 centered in the rest position on the pivot shaft 35. This ring is solid with a rod 70 sliding parallel to the structural member 4 and bearing at its end a roller 71 which runs on a cam 72 of suitable shape solid with the cross-member 19. The position of the cam may also be modified by the action of the driver or the speed regulator; its movement causes the rod 70 to rise with the ring 69, which spreads the branches of the scissors and causes a first pressure on the brake shoes. This first pressure causes rotation of the hinge 36 and engagement of the stabilizer device. The branches of the scissors present sufficient flexibility not to hinder the rising of the cross-member 19. The action of the centrifugal regulator may also be applied to the rod 70 to keep the cross-member 19 immobile, through the roller 71 and the cam 72, once the vehicle reaches a certain speed.

It will be appreciated that the lifting and clutch engagement systems are described above by way of example and are not limitative. Thus the lifting may be obtained by a winch of constant or variable radius, the secondary part may comprise different component than the body, for instance a simple mass or a spring, the clutch engagement may be obtained by pneumatic, hydraulic or electric devices, or a combination of such devices, or the clutch replaced by a dog-clutch, all these systems being available technology.

For example, in the embodiment shown in FIG. 5, the connection between the rocker-beam 2 and the rotatable component solid with the arm 5 is obtained by a cable. The rotatable component comprises a winch 9a around which the cable passes with sufficient turns, 3 to 5 for example, for the capstar effect to be used. The ends of the cable 73a, 73b are fixed to sector 74a, 74b solid with the rocker-beam 2 and, in the rest position, the cable is under little tension so as to slip on the winch 9a without rotating it.

Figure 16:
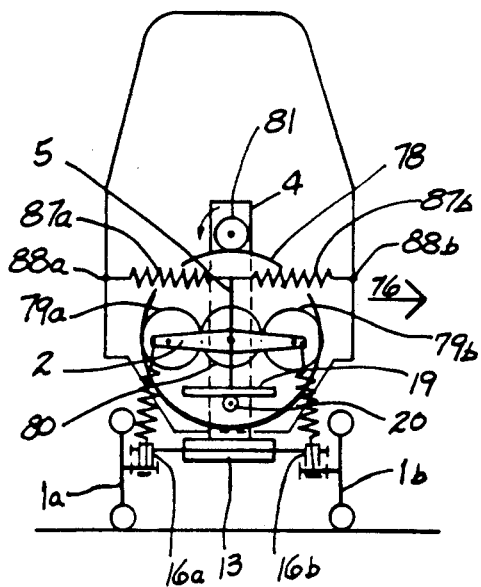
FIG. 16 is a partial schematic diagram of a connection system comprising an epicycloid train in which the reference is controlled by a servo-mecanism.
Figure 17:
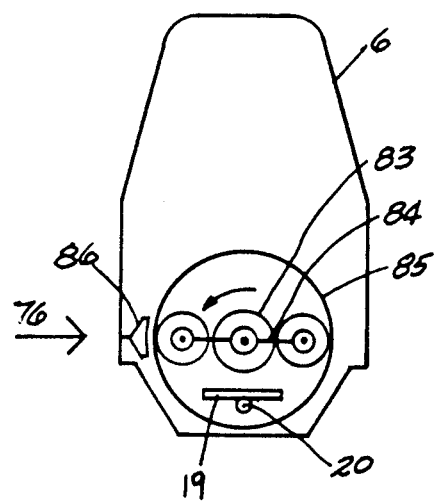
FIG. 17 is a partial schematic diagram illustrating the principle of the reference control servo-mecanism.

The body 6 is carried by the cross-member 19 which rests on a roller 20 placed at the end of the arm 5 solid with the winch 9a. The cross-member comprises two stops 75a, 75b which, in the case of lateral displacement of the cross-member, engage and bear on one or the other of the two stretches of cable. If, for example, the body moves in the direction of the arrow 76, the steps 75b apply slight tension to the cable 77b and this is sufficient for the capstar effect to apply tension to the stretch 77a and engage it with the winch 9a, which rotates the arm 5 and raises the cross-member 19. Moreover, it may be desirable, for a vehicle for use in varied terrains, or to avoid the driver having constantly to balance the vehicle, to provide a system such that the refence of the stabilizer, the line Io which is the origin of the angle α, is vertical, even if the terrain is not horizontal, or preferably and more generally is parallel to the apparent vertical, that is to say the resultant of gravity and centrifugal force. To this end, one at least of the rotatable parts connecting the primary and secondary may be put under the control of an independent rotatable member actuated by a servo-mecanism controlled by a pendulum, or a mass, or the body itself, as indicated in European Patent Nr 4230 of PATIN. As shown in FIG. 16, the rotation multiplier system may comprise an epicycloïd train comprising a ring gear 78 connected to the primary chassis, two satellites 79a, 79b borne by the rockerbeam 2 and a planetary wheel 80 solid with the arm 5 whose roller 20 bears the cross-member 19 solid with the body 6. The right gear 78 is positioned in rotation relative to the chassis 4 by a pinion wheel 81 which can be driven by a servo-mecanism shown schematically in FIG. 17.

This servo-mecanism comprises two epicycloïod trains forming an invertor, of which only one is shown for simplicity. The planetary wheel 83 of this train is driven by the engine of the vehicle or by an independent motor. The satellite-carrier 84 drives the pinion-wheel 81, if necessary through reduction gearing (not shown) and the ring gear 85 rotates freely under the control of a brake 86 solid with the body 6. Normally, the satellite-carrier 84 is immobile and the ring-gear 85 rotates idly. If the body 6 is pushed or tilt in the direction of the arrow 76, the ring-gear is braked and the satellite-carrier starts to turn in the same direction as the planetary-wheels, driving the pinion wheel 81 which causes the ring-gear to rotate relative to the chassis 4, which effectively modifies the reference connected to the chassis in a direction which will cause righting of the vehicle. In such a case, inertia of the body when the vehicle rights will tend to increase the effect of tilting of the body on the brake 86. This effect can be cancelled by a feed-back arrangement formed by two springs 87a, 87b connecting the arm 5 to two points 88a, 88b on the body, the rotation of the arm 5 diminishing the action of the body on the brake 86 by lengthering the spring 87b.

Any risk of swinging may be avoided by placing an irreversible reducing gear between the satellite-carrier, using available technology (not shown) for example, and which may be completed by a clutch as indicated above.

I claim:

1. An inclinable multi-wheel vehicle comprising: a vehicle chassis having a longitudinal beam extending along a longitudinal axis; a primary part comprising (1) a load bearing member having a lower end connected to said longitudinal beam, an intermediate portion, and an upper free end for supporting a vehicle body portion, and (2) a wheel supporting structure having a pair of wheels rotatably supported at opposite ends thereof, said wheel supporting structure being pivotally connected to said load bearing member at said intermediate portion; a secondary part comprising (1) a cross-member slidably mounted on said load bearing member, and (2) a rotatable are pivotally attached at one end to the free end of said load bearing member, the other end of said rotatable are having means affixed thereto for slidably engaging said cross-member; and, means located at said intermediate portion and said free end of said load bearing member respectively for interconnecting said primary part with said secondary part such that, pivotal movement of said load bearing member relative to said wheel supporting structure, causes movement of said secondary part with respect to said primary part so as to lift the center of gravity of said secondary part and raise the center of gravity of the whole vehicle.

2. A vehicle according to claim 1 wherein said means for interconnecting includes a clutch means which acts on said secondary part and includes actuation means for establishing connection between said secondary part and said load bearing member on inclination of the vehicle.

3. A vehicle according to claim 2 wherein said secondary part includes an inclinable driver's seat and said means for actuating includes a rocker arm for selectively allowing movement of said cross member and at least one cable for controlling movement of a rocker arm in response to inclination of the driver's seat.

4. A vehicle according to claim 3 wherein said means for actuating includes centrifugal means including a cable connecting said centrifugal means with said rocker arm to prevent movement of said cross member.

5. A vehicle according to claim 1 wherein said means for interconnecting includes a servo-mechanism means responsive to variations in the apparent vertical of the inclinable multi-wheel vehicle for modifying the connection between the primary part and the secondary part.

* * * * *

UNITED STATES PATENT AND TRADEMARK OFFICE
CERTIFICATE OF CORRECTION

PATENT NO. : 5,040,812
DATED : August 20, 1991
INVENTOR(S) : Pierre Patin It is certified that error appears in the above-identified patent and that said Letters Patent is hereby corrected as shown below:

Column 10, claim 1, line 42, delete "are" and insert --arm--.

Column 10, claim 1, line 44, delete "are" and insert --arm--.

Signed and Sealed this

Twelfth Day of January, 1993

*Attest:*

DOUGLAS B. COMER

*Attesting Officer*  *Acting Commissioner of Patents and Trademarks*